(No Model.)
W. MACY.
ATTACHMENT FOR BICYCLE PEDALS.
No. 592,801.  Patented Nov. 2, 1897.
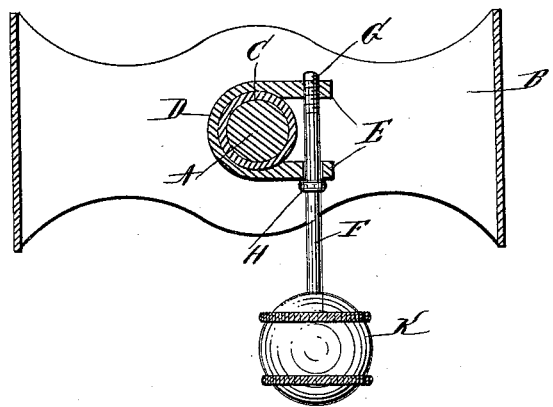
WITNESSES:
John Buckler,
C. Gerst
INVENTOR
Wendell Macy
BY
Edgar Tate & Co
ATTORNEYS.

UNITED STATES PATENT OFFICE.

WENDELL MACY, OF NANTUCKET, MASSACHUSETTS, ASSIGNOR OF ONE-HALF TO MILLARD F. FREEBORN, OF SAME PLACE.

ATTACHMENT FOR BICYCLE-PEDALS.

SPECIFICATION forming part of Letters Patent No. 592,801, dated November 2, 1897.

Application filed May 8, 1897. Serial No. 635,706. (No model.)

*To all whom it may concern:*

Be it known that I, WENDELL MACY, a citizen of the United States, residing at Nantucket, in the county of Nantucket and State of Massachusetts, have invented certain new and useful Improvements in Attachments for the Pedals of Bicycles, of which the following is a full and complete specification, such as will enable those skilled in the art to which it appertains to make and use the same.

This invention relates to attachments for the pedals of bicycles and similar vehicles; and the object thereof is to provide an attachment for the pedals of vehicles of this class by means of which said pedals may always be held in proper position to receive the foot.

The invention is fully disclosed in the following specification, of which the accompanying drawing forms a part, said drawing being a central transverse section of a pedal provided with my improvement.

In the drawing forming part of this specification the separate parts of my improvement are designated by letters of reference, and in said drawing I have shown at A the arm or shaft of a pedal-crank, on which the pedal B is mounted, and said pedal B is provided centrally with a tubular sleeve C, through which the arm or shaft A of the pedal-crank passes, and in the practice of my invention I mount on said tubular sleeve C, centrally thereof, a yoke-shaped clamp D, which is provided with projecting sides or arms E, and passing vertically through said sides or arms E of the yoke-shaped clamp B is a rod F, the upper end of which is screw-threaded, as shown at G, and the upper arm or side E of the yoke-shaped clamp D is also provided with a screw-threaded opening, through which the rod F passes, and said rod is provided with a collar H and at the lower end thereof with a knob or head K, and by turning the rod F, by means of the knob or head K, the arms or sides E of the yoke-shaped clamp D may be caused to securely grasp and hold the tubular sleeve C.

The knob or head K on the rod F operates as a weight to hold the pedal when not in use in the position shown in the drawing, and said pedal is therefore always in such position that the foot may be placed properly thereon, and my improvement may also be employed with particular advantage in connection with pedals provided with toe-clips, and in this case the toe-clip will always be held in proper position to receive the toe of the foot.

Having fully described my invention, I claim as new and desire to secure by Letters Patent—

1. A pedal for bicycles or similar vehicles, provided centrally with the usual tubular sleeve, and a clamp which is mounted on said sleeve, and provided with a rod which passes vertically therethrough, said rod being provided with a knob or head at its lower end, and the upper end being screw-threaded, substantially as shown and described.

2. A pedal for bicycles and similar vehicles, provided centrally with the usual tubular sleeve, and a clamp which is mounted on said sleeve, and provided with a rod which passes vertically therethrough, said rod being provided with a knob or head at its lower end, and the upper end being screw-threaded, and said rod being also provided with a collar, substantially as shown and described.

3. A pedal for bicycles and similar vehicles provided with the usual tubular sleeve through which the arm or shaft of the pedal-crank passes, and a yoke-shaped clamp, which is mounted on said sleeve, said clamp being provided with a rod which passes vertically through the sides thereof at one side of said sleeve, said rod being provided with a collar, and at the upper end thereof, with a screw-thread, and a knob or weight which is connected with the lower end of said rod, substantially as shown and described.

In testimony that I claim the foregoing as my invention I have signed my name, in presence of the subscribing witnesses, this 5th day of May, 1897.

WENDELL MACY.

Witnesses:
SUSIE AUSTIN,
GEORGE E. MOOERS.